(12) United States Patent
Rose, Jr. et al.

(10) Patent No.: US 12,078,602 B1
(45) Date of Patent: Sep. 3, 2024

(54) UNDERWATER X-RAY IMAGING SYSTEM

(71) Applicant: UT-Battelle, LLC, Oak Ridge, TN (US)

(72) Inventors: Paul B. Rose, Jr., Oak Ridge, TN (US); Jeremy Childress, Corvallis, OR (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/380,464

(22) Filed: Oct. 16, 2023

(51) Int. Cl.
*G01N 23/04* (2018.01)
*G01N 23/083* (2018.01)
*H05G 1/06* (2006.01)

(52) U.S. Cl.
CPC .......... *G01N 23/04* (2013.01); *G01N 23/083* (2013.01); *H05G 1/06* (2013.01)

(58) Field of Classification Search
CPC ................................ H05G 1/06; G01N 23/04
See application file for complete search history.

(56) References Cited

U.S. PATENT DOCUMENTS

| | | | |
|---|---|---|---|
| 11,405,548 B1 | 8/2022 | Sapp et al. | |
| 2003/0021386 A1* | 1/2003 | Tanaka | A61B 6/04 378/198 |
| 2003/0112926 A1* | 6/2003 | Atzinger | A61B 6/4441 378/196 |
| 2006/0098779 A1* | 5/2006 | Turner | A61B 6/14 378/102 |
| 2006/0104416 A1* | 5/2006 | Kump | A61B 6/4233 378/91 |
| 2010/0191107 A1* | 7/2010 | Bowers | A61B 6/5247 250/363.01 |
| 2011/0261516 A1* | 10/2011 | Kamiya | A61B 6/56 361/679.01 |
| 2012/0148031 A1* | 6/2012 | Eaves | A61B 6/588 378/198 |
| 2019/0239834 A1* | 8/2019 | Benson | H04N 5/321 |

FOREIGN PATENT DOCUMENTS

WO 2012/173703 12/2012

OTHER PUBLICATIONS

Oceaneering, "Subsea Digital Radiography—Computed or Digital Detector Array", available at oceaneering.com, copyright 2017, pp. 1-2.
Golden Engineering, Inc., Portable X-ray Technology XRS4, https://www.goldenengineering.com/products/xrs4/, available at least as of Oct. 16, 2023, pp. 1-2.
Sexton Custom Underwater Products, 476 X-ray camera design review #3, available at least as of Oct. 16, 2023, pp. 1-7.

* cited by examiner

*Primary Examiner* — Chih-Cheng Kao
(74) *Attorney, Agent, or Firm* — Warner Norcross + Judd LLP

(57) ABSTRACT

A self-contained emitter assembly according to one embodiment is provided to generate and emit X-rays underwater for facilitating X-ray imaging. The self-contained emitter assembly may be operable by a user underwater without connection to an external power supply and/or control circuitry.

14 Claims, 9 Drawing Sheets

UNDERWATER X-RAY IMAGING SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy and under Contract No. 0000-Z340-19 awarded by the Defense Threat Reduction Agency of the U.S. Department of Defense. The government has certain rights in the invention.

FIELD OF INVENTION

The present disclosure relates to the field of X-ray imaging and more particularly to the field of underwater X-ray imaging.

BACKGROUND

The value of X-ray imaging is something almost everyone understands. Trips to the airport, hospital, or dentist are frequent reminders of its value. In security and non-destructive testing (NDT) scenarios, where portability and ease-of-use has value, the combination of a pulsed X-ray source and a digital radiography panel is considered useful in the field.

However, in underwater environments, there are limited options for X-ray imaging. Conventional X-ray imaging systems for underwater imaging use strong gamma-emitting radioactive sources in marine "pigs" in the form of a device that can be placed within and moved through a pipeline. The use of these sources introduces both regulatory and safety concerns, which only accentuates the limited role of underwater X-ray imaging. Moreover, many of these conventional systems use storage phosphor panels, which require a visit to the surface to read each image. For instance, Oceaneering® produces large systems using X-rays and/or radioisotope, but these systems are designed only for pipelines and cannot be used for national security applications or anything sitting on a surface such as the ocean floor.

SUMMARY

In general, one innovative aspect of the subject matter described herein can be embodied in a system for underwater imaging. The system may include a self-contained emitter assembly operable to generate and emit X-rays underwater. The self-contained emitter assembly may include an X-ray emitter configured to generate X-rays, and a power supply operable to supply operational power to the X-ray emitter. The power supply may be rechargeable and may be adapted to supply sufficient power to the self-contained emitter assembly absent an external connection to a power supply. The self-contained emitter assembly may include a control system coupled to the power supply and the X-ray emitter, where the control system may be configured to direct operation of the X-ray emitter.

The system may include a housing containing the X-ray emitter, the power supply, and the control system. The housing may include an X-ray transmissive aperture operable to permit emission of X-rays from the self-contained emitter assembly toward a target. The housing may be a pressure tolerant enclosure configured to allow the self-contained emitter assembly to operate underwater at significant external pressures.

The system may include a detector operable to removably couple to the self-contained emitter assembly via a cable. The detector may be operable to detect X-rays emitted from the self-contained emitter assembly, and operable to transmit image information via the cable to the self-contained emitter assembly based on detected X-rays.

The system may include a mounting assembly for mounting the detector to the self-contained emitter assembly. The mounting assembly may be reconfigurable to facilitate at least one of 1) moving the detector relative to the self-contained emitter assembly and 2) affixing the system to another object.

The foregoing and other embodiments can each optionally include one or more of the following features, alone or in combination. In particular, one embodiment includes all the following features in combination.

In some embodiments, the mounting assembly may be reconfigurable to position the target between the detector and the self-contained emitter assembly, where the mounting assembly may be adaptable to accommodate differently sized targets.

In some embodiments, the mounting assembly may include a main support coupled to first and second arms. The first arm may be operably coupled to the self-contained emitter assembly, and the second arm may be operably coupled to the detector.

In some embodiments, the first and second arms may be adjustable in length such that each of the first and second arms is independently adjustable.

In some embodiments, the main support may be adjustable in length such that a distance between the first and second arms is variable.

In some embodiments, the first and second arms may be coupled respectively to first and second ends of the main support.

In some embodiments, the system may include a user interface is mountable to the self-contained emitter assembly. The self-contained emitter assembly may include a user interface connector for connection to a cable, and the user interface may be operable to communicate with the control system of the self-contained emitter assembly via the cable connected to the user interface connector.

In some embodiments, the user interface may be operable to receive information based on the image information from the control system of the self-contained emitter assembly.

In some embodiments, the detector may be moveable relative to the self-contained emitter assembly, such that the detector is movable over a variable distance from the X-ray transmissive aperture.

In some embodiments, the self-contained emitter assembly may include an external connector operable to communicate with an external device via a cable.

In general, one innovative aspect of the subject matter described herein can be embodied in a system for underwater imaging that includes a self-contained emitter assembly operable to generate and emit X-rays underwater. The self-contained emitter assembly may include an X-ray emitter configured to generate X-rays and a power supply operable to supply operational power to the X-ray emitter. The self-contained emitter assembly may include a control system coupled to the power supply and the X-ray emitter, where the control system may be configured to direct operation of the X-ray emitter. The self-contained emitter assembly may include a housing containing the X-ray emitter, the power supply, and the control system. The housing may include an X-ray transmissive aperture operable to permit emission of X-rays from the self-contained emitter assembly toward a target. The system may include a detector operable to removably couple to the self-contained emitter assembly via a cable. The detector may be operable to detect X-rays emitted from the self-contained emitter assembly and may be operable to transmit image information to the self-contained emitter assembly based on detected X-rays.

The foregoing and other embodiments can each optionally include one or more of the following features, alone or in combination. In particular, one embodiment includes all the following features in combination.

In some embodiments, the detector may be operable to conduct an area scan of X-rays emitted from the self-contained emitter assembly.

In some embodiments, the self-contained emitter assembly may include an external connector operable to communicate with an external device via a cable.

In some embodiments, the external device may be provided above-water.

In some embodiments, the self-contained emitter assembly may be operable to transmit information based on the image information to the external device via the cable.

In some embodiments, a user interface may be mountable to the self-contained emitter assembly. The self-contained emitter assembly may include a user interface connector for connection to a cable, and the user interface may be operable to communicate with the control system of the self-contained emitter assembly via the cable connected to the user interface connector.

In some embodiments, the user interface may be provided as part of the self-contained emitter assembly. As an example, a portion of the user interface may be within the self-contained emitter assembly, and the user interface may provide at least a portion of the exterior surface of the self-contained emitter assembly.

In some embodiments, the user interface may be operable to receive information based on the image information from the control system of the self-contained emitter assembly.

In some embodiments, the detector may be moveable relative to the self-contained emitter assembly, such that the detector is movable over a variable distance from the X-ray transmissive aperture.

In some embodiments, the detector may be movable by an underwater operator.

In some embodiments, a mounting assembly for mounting the detector to the self-contained emitter assembly may be provided. The mounting assembly may be reconfigurable to facilitate at least one of 1) moving the detector relative to the self-contained emitter assembly and 2) affixing the system to another object.

In some embodiments, the housing may be a pressure tolerant enclosure configured to allow the self-contained emitter assembly to operate underwater at significant external pressures.

In general, one innovative aspect of the subject matter described herein can be embodied in a self-contained emitter assembly for use in underwater imaging. The self-contained emitter assembly may include an X-ray emitter configured to generate X-rays and a power supply operable to supply operational power to the X-ray emitter. The self-contained emitter assembly may include a control system coupled to the power supply and the X-ray emitter, where the control system may be configured to direct operation of the X-ray emitter. The self-contained emitter assembly may include a housing containing the X-ray emitter, the power supply, and the control system. The housing may include an X-ray transmissive aperture operable to permit emission of X-rays from the self-contained emitter assembly toward a target.

The foregoing and other embodiments can each optionally include one or more of the following features, alone or in combination. In particular, one embodiment includes all the following features in combination.

In some embodiments, the self-contained emitter assembly may include an external connector operable to communicate with an external device via a cable.

In some embodiments, the external device may be provided above-water.

In some embodiments, the control unit may be operable to transmit information based on the image information to the external device via the cable.

In some embodiments, the self-contained emitter assembly may include a detector connector operable to couple the control unit, via a cable, to a detector external to the housing of the self-contained emitter assembly. The control unit may be operable to receive image information from the detector via the cable.

In some embodiments, the housing may be movable relative to the detector, such that a distance between the X-ray transmissive aperture and the detector is variable.

In some embodiments, the housing may be configured to interface with a mounting assembly to facilitate affixing the housing to another object.

In some embodiments, the housing may be a pressure tolerant enclosure configured to allow the self-contained emitter assembly to operate underwater at significant external pressures.

In some embodiments, the X-ray emitter may be configured to generate X-rays in a pulsed manner.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figure 1:
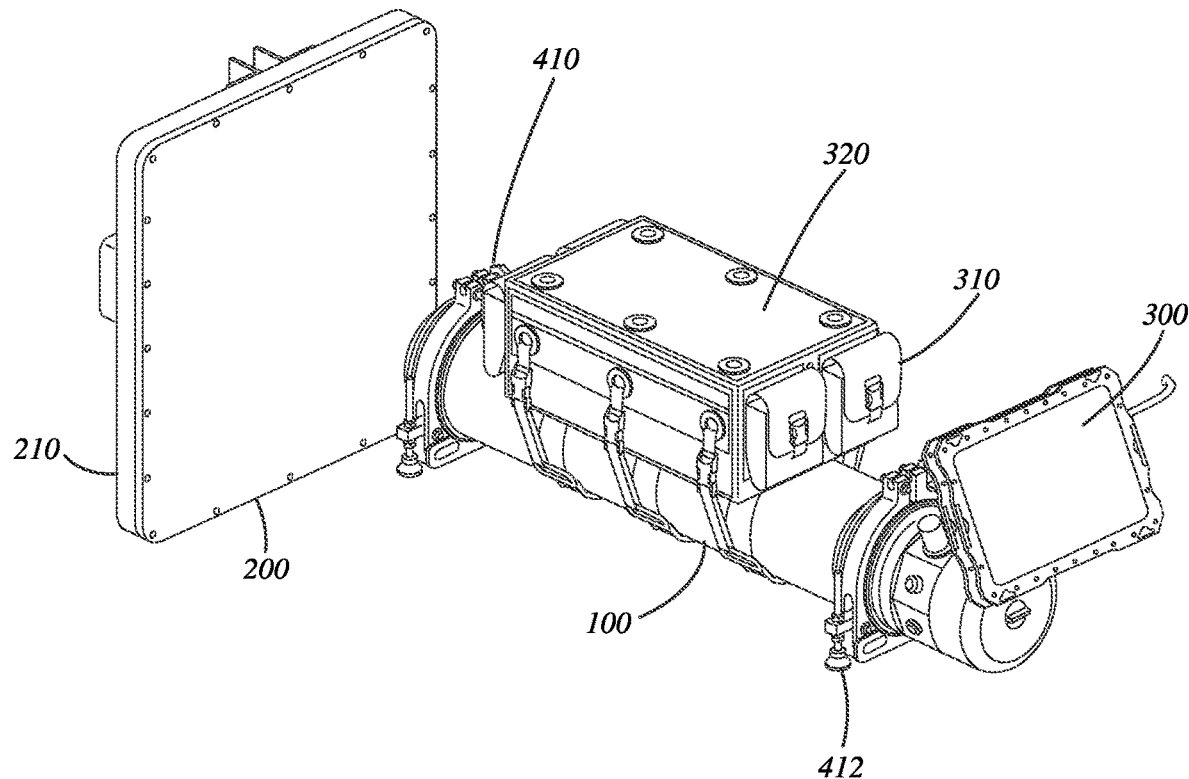
FIG. 1 shows a self-contained emitter assembly and a detector according to one aspect.
Figure 2:
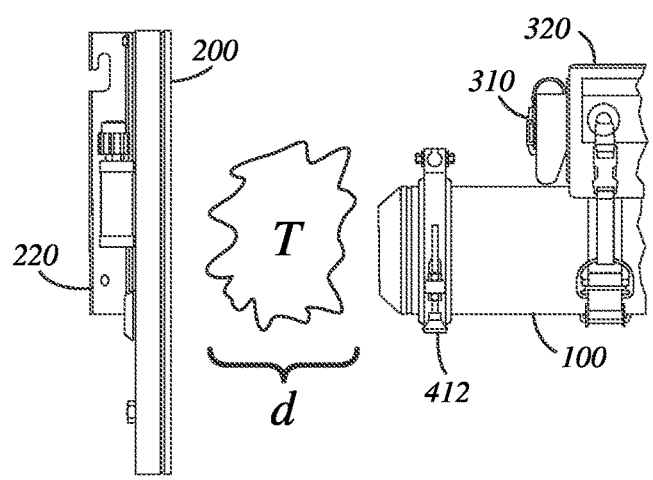
FIG. 2 shows a side view of the self-contained emitter assembly and the detector.

A self-contained emitter assembly according to one embodiment is provided to generate and emit X-rays underwater for facilitating X-ray imaging. The self-contained emitter assembly may be operable by a user underwater without connection to an external power supply and/or external control circuitry. Such a self-contained emitter assembly according to one aspect is shown in FIGS. 1 and 2 and generally designated 100.

The self-contained emitter assembly 100 may be operable to facilitate providing a real-time image to a diver or operator. Conventional systems are based on analog imaging systems that must be taken back to land and analyzed, and the radiation sources are typically radio-isotope sources, which are very high activity. These types of high activity sources may call for substantial safety mitigation measurements and regulatory compliance because they pose a risk of leaking and contaminating the water and anything in the area. The self-contained emitter assembly 100 and other components of the system are not dependent on such high activity sources, and therefore are not subject to the same types of mitigation constraints.

The self-contained emitter assembly 100 may facilitate making underwater X-ray imaging accessible to a wide range of security, NDT, law enforcement, and general inspection users without the logistics challenges of storage phosphors and without the regulatory and safety implications of using a sealed radioactive source to generate radiation. The self-contained emitter assembly 100 in conjunction with other components of an imaging system may allow users to obtain high resolution X-ray radiographic images of underwater targets through more than 15 inches of water by using a 370 keV pulsed X-ray generator and digital radiography panel, while using familiar Novo DR or X-Ray Toolkit (XTK) software, for example.

The self-contained emitter assembly 100 may be operable in conjunction with one or more external components in an underwater environment. For instance, the self-contained emitter assembly 100 may be coupled to a detector 200 that is movable relative to the self-contained emitter assembly 100. The detector 200 may be provided at a distance d from an aperture 152 of the self-contained emitter assembly 100, as described herein, with a target T disposed between the self-contained emitter assembly 100 and the detector 200. The target T may be any type of underwater object, including but not limited to X-Ray inspection of underwater pipe and valves, ship or boat hulls, and unexploded ordinance.

The detector 200 may be configured to detect X-rays emitted from the self-contained emitter assembly 100 and generate image information based on the detected X-rays. This image information may pertain to the target T and may be communicated to the self-contained emitter assembly 100 via a cable provided between the self-contained emitter assembly 100 and the detector 200. In one aspect, the detector 200 may be configured for an area scan with respect to X-rays emitted from the self-contained emitter assembly 100, thereby enabling rapid detection and imaging with respect to the target T. Alternatively, the detector may be configured for detection in a different manner, including but not limited to a linear scan of X-rays emitted from the self-contained emitter assembly 100.

The detector 200 in one aspect may include a detector mount 220 operable to facilitate connection to a mounting system 500, as described herein. The detector 200 may also include a detector housing 210 that is pressure tolerant and contains the detector panel or sensor that detects X-rays emitted from the self-contained emitter assembly 100.

The self-contained emitter assembly 100 may be operatively coupled to a float system 320, which may be adapted to facilitate providing neutral buoyancy with respect to the self-contained emitter assembly 100 and optionally additional components coupled to the self-contained emitter assembly 100. The float system 320 may include one or more trim holders 310 (e.g., trim weight bags) in which weight may be added or removed in order to adjust the float system 320 for neutral buoyancy, positive buoyancy, or negative buoyancy. The float system 320 may be configured to provide a slight positive, a slight negative, or a neutral buoyancy with respect to the system. The float system in one aspect may have a depth rating of approximately up to 6000 feet, and an adjustable buoyancy via the trim holders 310, such as positive or negative 2 pounds.

An emitter assembly mount 410 may be provided in conjunction with the self-contained emitter assembly 100. The emitter assembly mount 410 may take the form of a quick release clamping system that is adapted to engage an exterior of a housing 150 of the self-contained emitter assembly 100 and to removably couple to a mounting system 500 or another component, as described herein. In one aspect, more than one emitter assembly mount 410 may engage the housing 150 to facilitate securely coupling the self-contained emitter assembly 100 to the mounting system 500 or another component. In one aspect, each emitter assembly mount 410 may include one or more feet 412 (potentially leveling feet) operable to allow adjustments to alignment or positioning of the self-contained emitter assembly 100 relative to the target T and/or the detector 200. The feet 412 may be magnetic in one aspect.

In one aspect, a user interface 300 may be removably coupled to the self-contained emitter assembly 100. The user interface 300, for example, may be a pressure tolerant touch screen assembly. The user interface 300 may be communicatively coupled to the self-contained emitter assembly 100 in order to direct operation thereof and/or receive information based on the image information provided by the detector to the self-contained emitter assembly 100. For instance, the user interface 300 may display an X-ray image of the target T based on the X-rays emitted by the self-contained emitter assembly 100 and detected by the detector 200. Additionally, or alternatively, the user interface 300 may enable the user to direct the self-contained emitter assembly 100 to begin steps to image the target T.

In one aspect, the user interface 300 may be communicatively coupled to the self-contained emitter assembly 100 via a user interface cable and an external device connector 184. Communications may be established according to a network protocol but are not so limited and may be established according to any type of communication protocol over any type of medium.

In one aspect, the user interface 300 may be fixedly mounted to the self-contained emitter assembly 100 via an accessory mount 180 and a user interface coupler 302. The accessory mount 180 and the user interface coupler 302 may provide a ball and socket coupling (or ball mount) to enable repositioning of the user interface 300.

The user interface 300 may be operable to communicate with the control system 120 of the self-contained emitter assembly 100 in order to direct operation thereof and/or receive information from the control system 120, such as information based on image information received by the self-contained emitter assembly 100 from the detector 200. For instance, the user interface 300 may include a touch screen that enables the operator to direct operation of the self-contained emitter assembly 100 and/or the user interface 300, itself. The user interface 300 may be operable to facilitate reviewing images obtained by the self-contained emitter assembly 100 and the detector 200. In one aspect, the user interface 300 may be operable to change variables associated with operation of the self-contained emitter assembly 100 and the detector 200. For instance, the user interface 300 may enable changing operational variables, such as the number of pulses generated by the X-ray emitter 110 for X-ray imaging. Although the X-ray emitter 110 is described herein as being capable of generating X-rays in a pulsed manner—it is to be understood that the present disclosure is not so limited and that X-rays may be emitted in any manner, including in a continuous manner.

In one aspect, the self-contained emitter assembly 100 may form part of a system that includes the detector 200. Additional components may be part of the system, such as those described in conjunction with the systems 1000, 2000. However, it is to be understood that the present disclosure is not limited to any particular configuration-additional or fewer components may be utilized in conjunction with the self-contained emitter assembly 100 such that one or more components described in a first system herein may be provided in a second system herein and optionally one or more components of the first system may be absent in such a configuration. The same variability may be applied with respect to the self-contained emitter assembly 100 and various aspects described herein—e.g., the self-contained emitter assembly 100 described in in one aspect herein may include one or more features from another aspect described herein and optionally one or more features of the self-contained emitter assembly 100 may be absent in such a configuration.

In one aspect, the self-contained emitter assembly 100 may include an X-ray emitter 110, which may be the form of a modified form-factor XRS-4 pulsed X-ray generator, which generates X-ray radiation by accelerating electrons into a tungsten target to create Bremsstrahlung X-rays. A collimated beam of those X-rays may be directed toward a target T. As the X-rays pass through the target T, regions of higher density in the target T absorb more X-ray radiation leaving information about the internal composition of the target T that can be measured by looking at exiting X-ray intensities. Those exiting X-ray intensities may then be measured in real-time by a detector 200, such as, for example, a Novo flat panel digital detector, allowing users to view an image of the target T.

One or more systems described herein (e.g., a diver-operated underwater pulsed X-ray imaging system) are configured differently from a land-based configuration. The X-ray emitter (e.g., X-ray generator) and control system 120 are inside a housing 150 (e.g., an anodized aluminum housing) to keep the X-ray subcomponents isolated from damaging salt water and pressure.

The detector 200 may also include a detector housing 210 that contains a panel or sensor that is operable to detect the X-rays emitted from the self-contained emitter assembly 100. The detector housing 210 may be an anodized aluminum housing to keep the X-ray subcomponents substantially isolated from potentially damaging effects of salt water and pressure. The detector housing 210 may be rated for depths up to 300 feet-however, the detector housing 210 may be configured differently for greater depths. The detector 200 may include an X-ray imaging panel disposed within the detector housing 210, such as, for example, a Novo WN22 digital imaging panel. The detector 200 in one aspect may have a neutral buoyancy or a negative buoyancy of approximately 10 pounds—it should be understood that the buoyancy of the detector 200 may vary from application to application.

It is noted that the housing 150 and the detector housing 200 are described as being made of aluminum in one or more aspects of the disclosure. The thickness of the aluminum may be selected to reduce or minimize the amount of aluminum the X-rays needed to pass through while providing pressure tolerance. Stainless steel, titanium, or plastic materials, or a combination thereof, may also be utilized to form all or a portion of the housing 150.

The self-contained emitter assembly 100 in one aspect may have a negative buoyancy of about 22 pounds. It is to be understood that the buoyancy of the self-contained ammeter assembly 100 is not limited to this specific value and that the buoyancy may vary from application to application.

Operating underwater also can present significant communication challenges. Conventional radiofrequency (RF) wireless operation is unlikely, and so a wired configuration may be used with the control system 120 and an external device connected via a cable and the external device connector 184. In one embodiment, the control system 120, for example, may include a Falcon II controller, wet-mate connectors for the detector connector 182 and the external device connector 184, and two cables. One of the cables may connect the self-contained emitter assembly 100 to the detector 200. The other cable may connect the self-contained emitter assembly 100 to a user interface 300 underwater or a controller 614 above water, or both. The controller 614 above water may offer wired or wireless connection options to a personal computer (PC), tablet, or phone running Novo or XTK software, for example.

A user U (e.g., a diver) may spend a significant period of time underwater imaging different targets T, particularly in NDT applications, so power for extended periods of time is a consideration. The above-water controller 614 can be coupled to a power supply above water and supply power to the self-contained emitter assembly 100 via the cable and the external device connector 184, enabling the above-water controller 614 and/or the above-water power supply to charge the self-contained emitter assembly 100.

Figure 3:
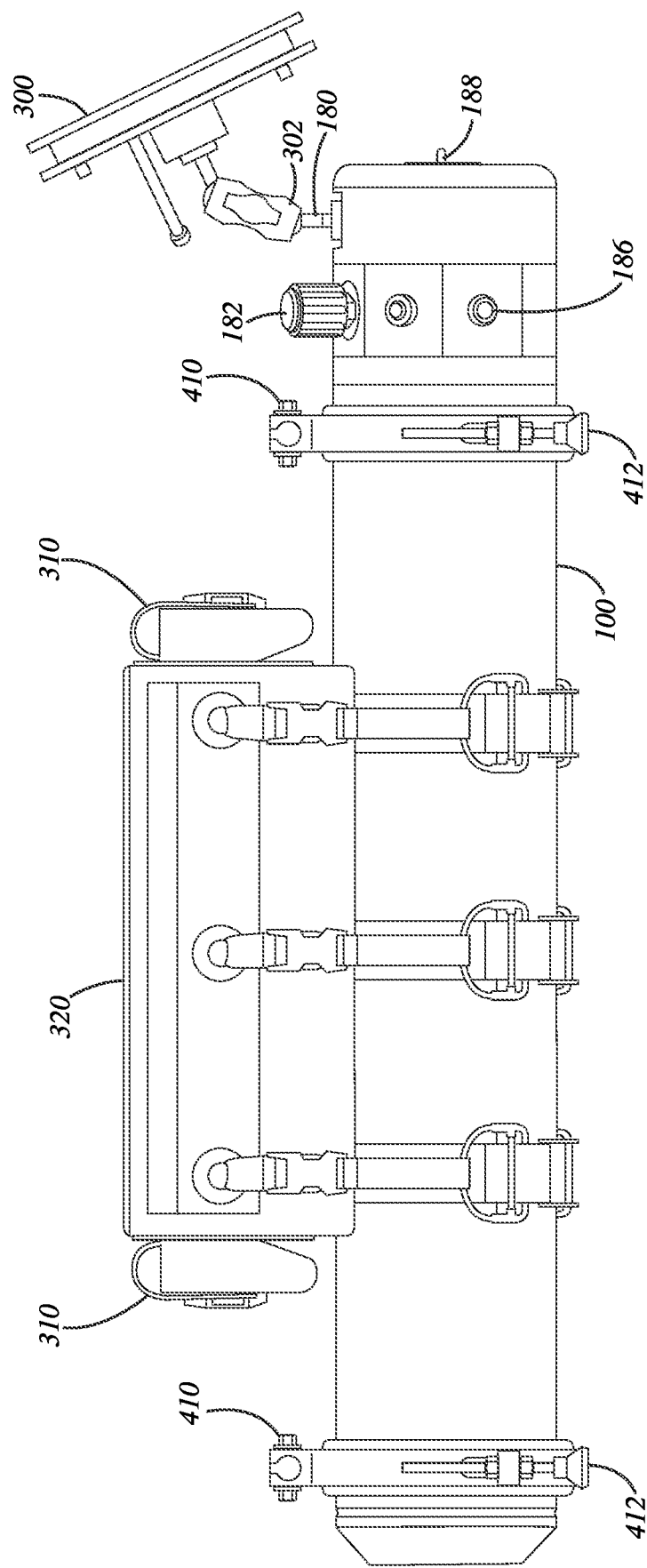
FIG. 3 shows a side view of the self-contained emitter assembly.
Figure 4:
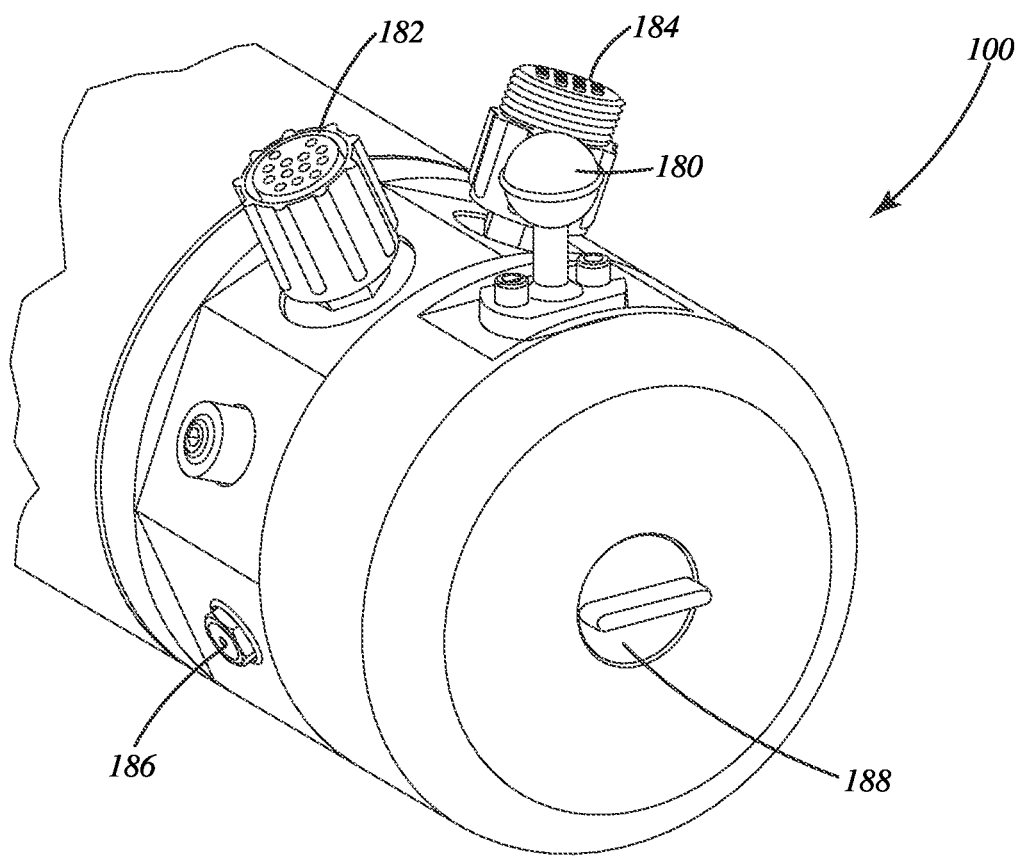
FIG. 4 shows a partial perspective view of the self-contained emitter assembly.

The self-contained emitter assembly 100 is depicted in further detail in FIGS. 3 and 4, showing the position of the user interface 300 relative to the self-contained emitter assembly 100 as well as the accessory mount 180 and the user interface coupler 302.

In one aspect, the self-contained emitter assembly 100 includes a pressure relief valve 186, a detector connector 182, and an external device connector 184. The pressure relief valve 186 may be provided in case the internal pressure of the self-contained emitter assembly 100 rises above a threshold value, potentially protecting the internal components of the self-contained emitter assembly 100 as well as potentially preventing damage to the housing 150 of the self-contained emitter assembly 100. The pressure relief valve 186 in one aspect may correspond to a self-venting pressure relief valve.

The self-contained emitter assembly 100 in one aspect may include one or more sacrificial zinc anodes.

As described herein, the self-contained emitter assembly 100 may be communicatively coupled to the detector 200 via a cable. The cable may be coupled to the self-contained emitter assembly 100 via the detector connector 182 (e.g., an underwater connector), which may be electrically coupled to a control system 120 of the self-contained emitter assembly 100.

The external device connector 184 in one aspect may enable coupling the self-contained emitter assembly 100 to an external device, such as an above-water device. The external device in one aspect may be operable to provide power and/or communicate with the self-contained emitter assembly 100. For instance, the external device may supply power to the self-contained emitter assembly 100 in order to charge internal batteries as part of a power supply within the self-contained emitter assembly 100.

The self-contained emitter assembly 100 in one aspect may also include an external power switch 188 manually operable by a user U underwater to turn ON or OFF self-contained emitter assembly 100, enabling the user U to conserve power underwater during times when the soft contained emitter assembly 100 is not in use.

Figure 5:
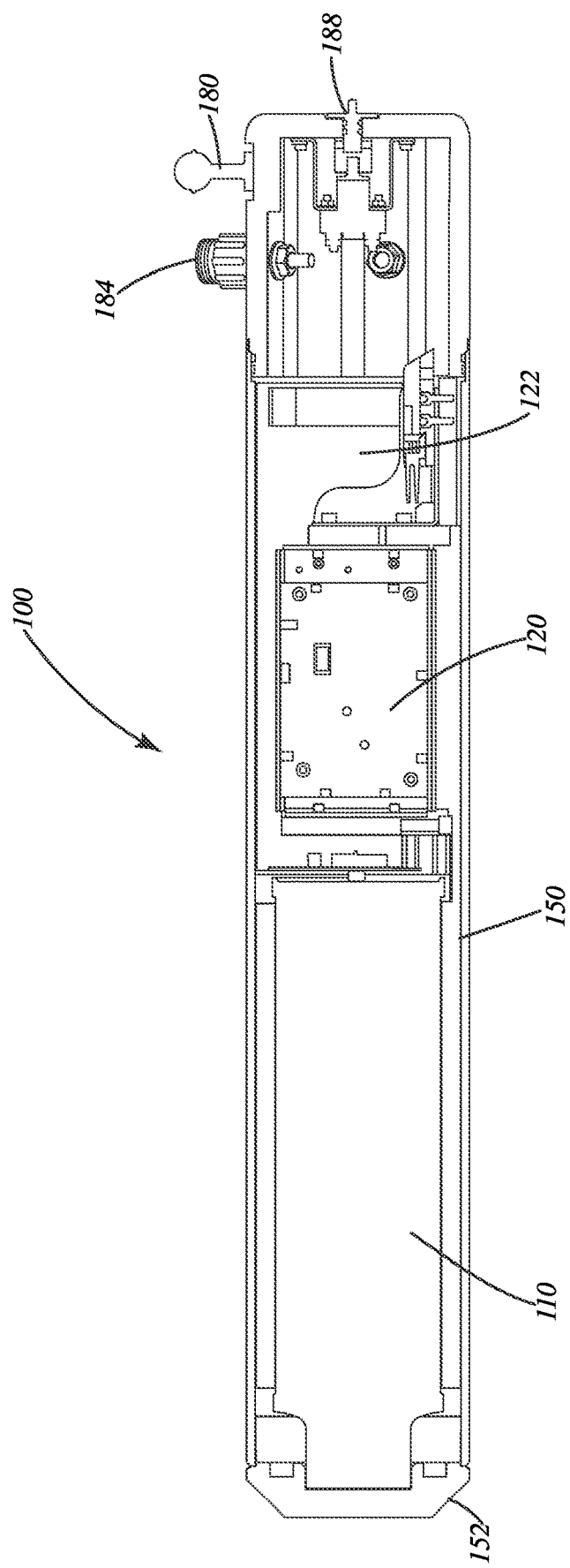
FIG. 5 shows a sectional view of the self-contained emitter assembly.

Turning to the cross-section of the self-contained emitter assembly 100 depicted in FIG. 5, several internal components are shown. The self-contained emitter assembly 100 may include components sufficient to enable operation of the self-contained emitter assembly 100 without external power and/or data connections. Although the self-contained emitter assembly 100 is operable to communicate and receive power from an external device, as described herein, the self-contained emitter assembly 100 may be configured so that it is not necessary to communicate or receive power from such an external device in order to operate in conjunction with the detector 200 for X-ray imaging of the target T. In one aspect, the self-contained emitter assembly 100 may be operable to supply power to one or more external devices, such as the detector 200 and/or a user interface 300.

The self-contained emitter assembly 100 in one aspect may include an X-ray emitter 110 configured to generate X-rays. The X-ray emitter may be battery powered and capable of emitting X-rays in a pulsed manner. The X-ray emitter 110 in one aspect, for example, may correspond to a modified version of the XRS4 X-ray generator provided by Golden Engineering, Inc.—however, it is to be understood that the present disclosure is not so limited and that any type of X-ray generator may be provided within the self-contained emitter assembly 100. The housing 150 of the self-contained emitter assembly 100 may include an X-ray emitter 110 that is a modified form-factor Golden XRS-4 370 keV pulsed generator for fitting within the housing 150.

The X-ray emitter 110 in one aspect may provide X-ray energy above 170 kilowatts, optionally above 370 kilowatts.

The self-contained emitter assembly 100 in conjunction with the detector 200 may facilitate imaging targets T greater than ¼ inch thickness. The intensity of the X-rays emitted from the self-contained emitter assembly 100 may be varied depending on the thickness of the target T.

The self-contained emitter assembly 100 in one aspect may include a control system 120, which may include circuitry operable to carry out one or more functions of the assembly or communicate with one or more other components of the assembly (such as to receive sensor feedback from a component and/or direct operation of a component), or a combination thereof. Components of the self-contained emitter assembly 100 may include the X-ray emitter 110, the power supply 122, and internal components of the manual switch 188—but the present disclosure is not so limited and any component internal to the self-contained emitter assembly 100 may be coupled to the control system 120. Additionally, or alternatively, the control system 120 may be operable to communicate with one or more components external to the self-contained emitter assembly 100, such as the detector 200, the user interface 300, or an external device, or a combination thereof. Communication, internal or external to the self-contained emitter assembly 100, with the control system 120 may be carried out or conducted in a variety of ways, including over wireless or wired mediums and according to any type of protocol, such as serialized communications or discrete (e.g., high/low) signals.

The control system 120 may include electrical circuitry and components to carry out the functions and algorithms described herein. Generally speaking, the control system 120 may include one or more microcontrollers, microprocessors, and/or other programmable electronics that are programmed to carry out the functions described herein. The control system 120 may additionally or alternatively include other electronic components that are programmed to carry out the functions described herein, or that support the microcontrollers, microprocessors, and/or other electronics. The other electronic components include, but are not limited to, one or more field programmable gate arrays (FPGAs), systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the system or aspects thereof, or they may reside in a common location within the system or an aspect thereof. When physically distributed, the components may communicate using any suitable serial or parallel communication protocol, such as, but not limited to, Ethernet, Local Area Network (LAN), CAN, LIN, Vehicle Area Network (VAN), FireWire, I2C, RS-232, RS-485, and Universal Serial Bus (USB).

The self-contained emitter assembly 100 in one aspect may include a power supply 122 (e.g., a battery) operable to supply power to the X-ray emitter 110 and the control system 120, as well as any other components internal or external to the self-contained emitter assembly 100, such as the detector 200 and the user interface 300. The power supply 122 may be rechargeable within the housing 150 without removal of the power supply 122 therefrom. For instance, the power supply 122 may be recharged via power supplied from an external device such as through the external device connector 184. The power supply 122 may be provided within a battery compartment of the housing 150, in one aspect.

In one aspect, the power supply 122 may be removed from the self-contained emitter assembly 100 for charging and/or replacement.

The self-contained emitter assembly 100 in one aspect may include a housing 150 that contains one or more components of the self-contained emitter assembly 100, such as the X-ray emitter 110, the control system 120, and the power supply 122. The housing 150 may be a pressure tolerant housing operable to substantially protect the internal components of the self-contained emitter assembly 100 from external pressure below water, such as, for example, at depths rated up to 4000 ft. The housing 150 may be formed of one or more materials. For instance, the housing 150 may be an aluminum housing. As another example, the housing 150 may be formed of carbon fiber, steel, titanium, or aluminum, or a combination thereof.

The housing 150 may include an aperture 152 that is transmissive with respect to X-rays emitted from the X-ray emitter 110. In one aspect, the aperture 152 may be substantially formed of aluminum-however, the present disclosure is not so limited and any type of material may be utilized including a material different from other parts of the housing 150. The aperture 152 may, for instance, be formed of titanium, steel, or carbon fiber. The aperture 152 may be welded or otherwise secured to a main body of the housing 150.

The detector 200 may include an underwater X-ray panel housing and contain, for example, a Novo WN22 digital radiography panel. The X-Ray emitter 110, the control system 120, and the detector 200 may communicate through a single umbilical or cable via the detector connector 182. Another cable may connect the self-contained emitter assembly 100 to an external device, such as a power and communications box 614 on the surface or a user interface 300 below water. In the above water configuration, as an example, a user can interface with the system using a Windows PC/laptop, Mac, Android Tablet, or Android phone running either Novo imaging software or X-Ray Toolkit (XTK).

Figure 6A:
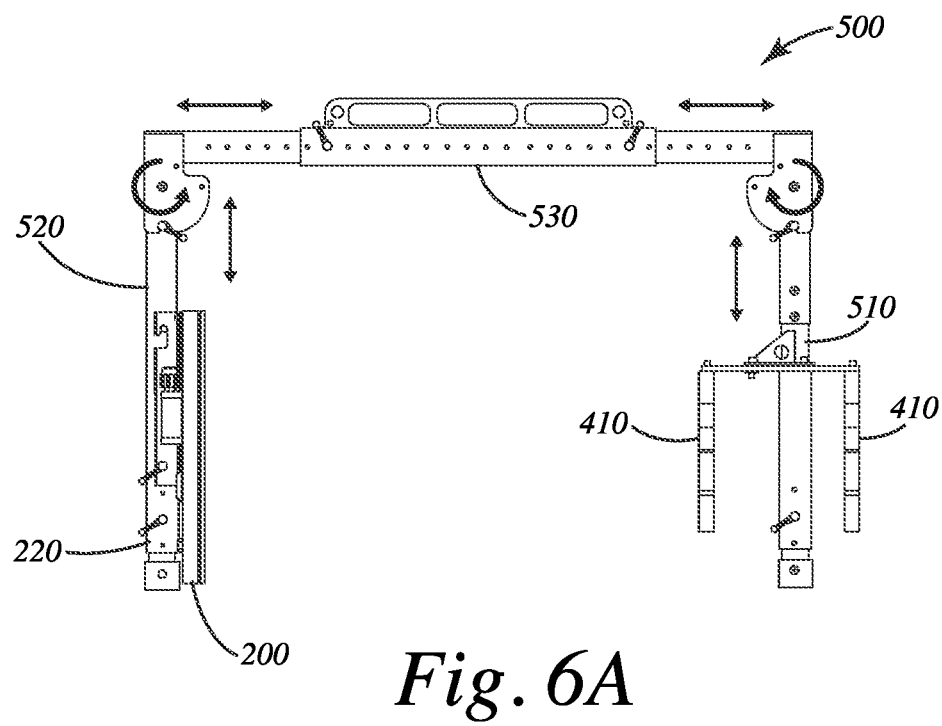
FIG. 6A shows a mounting system according to one aspect.
Figure 6B:
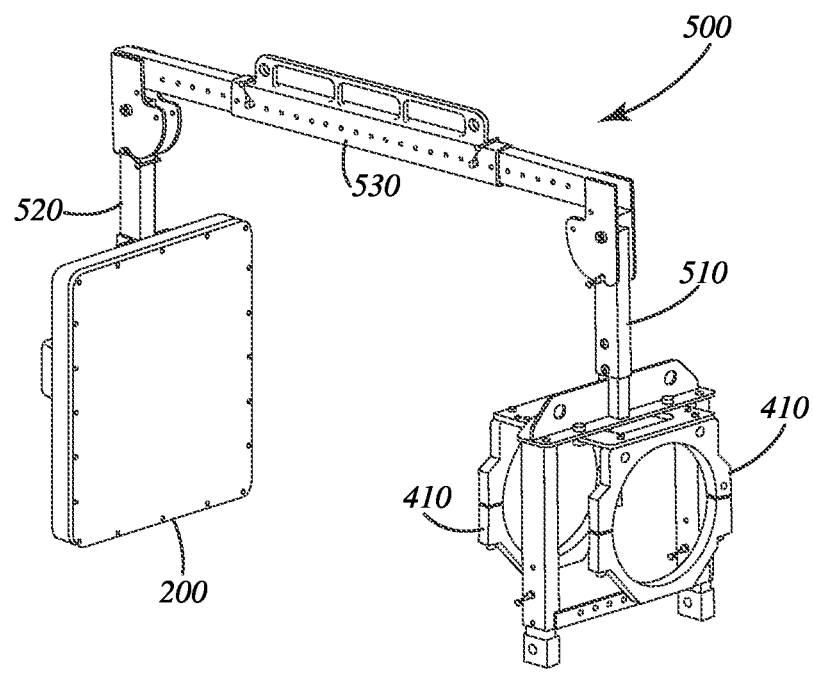
FIG. 6B shows a perspective view of the mounting system of FIG. 6A.

A mounting system 500 according to one aspect is shown in further detail in FIGS. 6A and 6B. The mounting system 500 may be operable to facilitate positioning the self-contained emitter assembly 100 relative to the detector 200 in a variety of ways. For instance, the mounting system 500 may be configured to enable positioning of the aperture 152 of the self-contained emitter assembly 100 at a variable distance D relative to the detector 200. This may enable providing a variety of targets T of various shapes and sizes between the aperture 152 and the detector 200. The size of the aperture 152 and the distance between the target T and the aperture may affect the beam diameter at the target T.

The mounting system 500 in one aspect may include a main support 530 adjustable in length along its longitudinal axis. For instance, the main support 530 may include two or more members that may be telescoping with respect to each other. The main support 530 may include one or more apertures that interface with one or more pins that enable releasing and locking the main support 530 at specific lengths, enabling adjusting the main support 530 to a particular length.

The main support 530 may be coupled to a first arm 510 and a second arm 520. The first arm 510 may be adjustable in length along its longitudinal axis in a manner similar to the adjustment configuration for the main support 530. For instance, the first arm 510 may include two or more members that may be telescoping with respect to each other. The first arm 510 may be optionally rotatably coupled to the main support 530, enabling the first arm 510 to fold or rotate toward the main support 530 for flat storage of the mounting system 500. The second arm 520 may be configured similarly. The mounting system 500 may provide a rigid, foldable, and adjustable scaffolding.

The first arm 510 in one aspect may be removably coupled to the emitter assembly mount 410 in order to facilitate mounting the self-contained emitter assembly 100 to the mounting system 500.

In one aspect, the second arm 520 may be adjustable in length along its longitudinal axis in a manner similar to the main support 530 or the first arm 510. For instance, the second arm 520 may include two or more members that may be telescoping with respect to each other. The second arm 520 in one aspect may be removably coupled to the detector 200 via a detector mount 220.

In one aspect, with the main support 530, the first arm 510, and the second arm 520 all being adjustable in length, the overall length of the mounting system 500 may be adjusted as well as the overall a height of the mounting system 500. This configurability may enable positioning the self-contained emitter assembly 100 relative to the detector 200 at a variety of distances and to accommodate a variety of target T configurations.

Figure 7A:
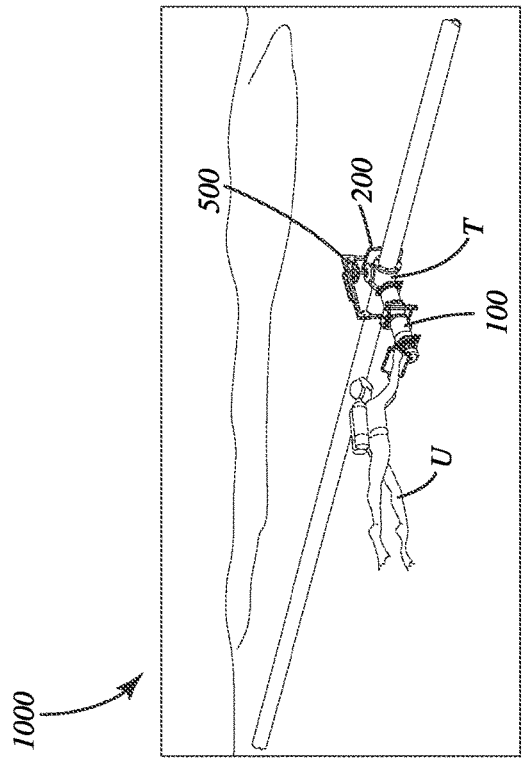
FIG. 7A shows a system according to one aspect of the present disclosure.
Figure 7B:
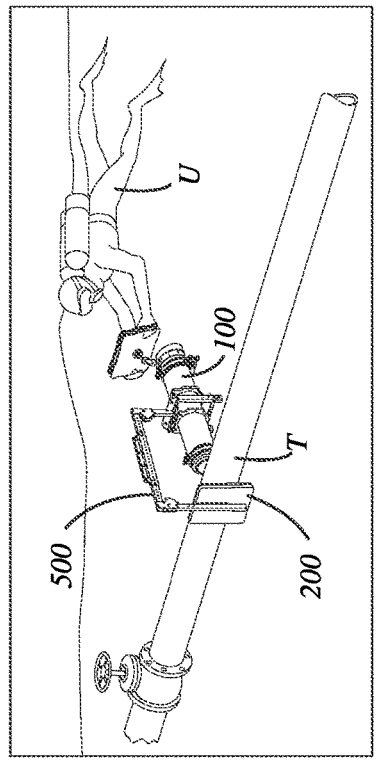
FIG. 7B shows a system according to one aspect of the present disclosure.
Figure 7C:
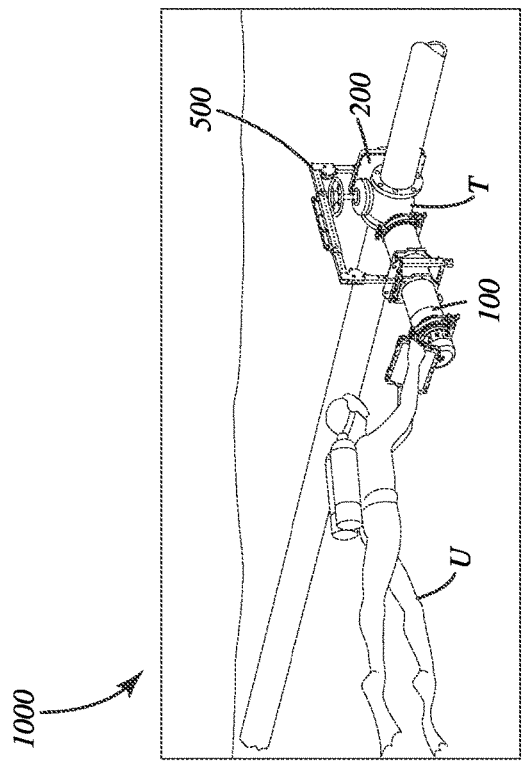
FIG. 7C shows a system according to one aspect of the present disclosure.
Figure 7D:
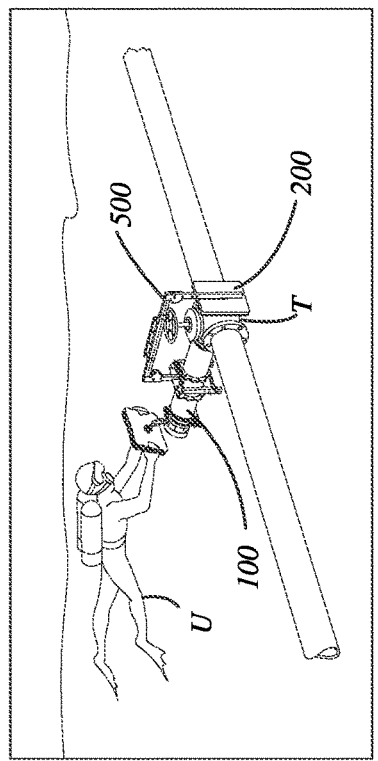
FIG. 7D shows a system according to one aspect of the present disclosure.
Figure 8:
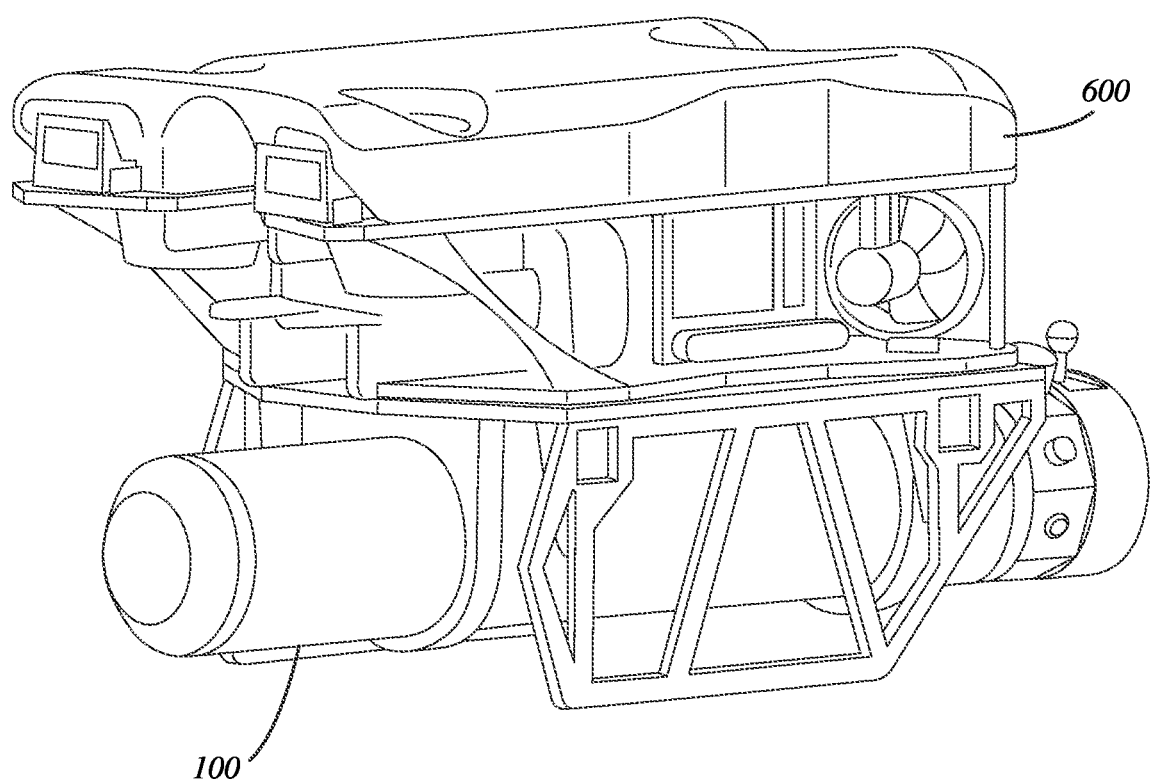
FIG. 8 shows a system according to one aspect of the present disclosure.

To provide some examples, in FIGS. 7A-7D, a user U is shown operating the self-contained emitter assembly 100 in conjunction with the mounting system 500 and a detector 200 as part of a system 1000 relative to a target T. It can be seen that the shape and size of the target T can vary and the mounting system 500 may be reconfigurable to accommodate the differently sized targets T. For instance, the target T in FIG. 7A is taller than the target T in FIG. 7B so that the length of the arms 510, 520 is longer in FIG. 7A than in FIG. 7B.

The system 1000 and/or the self-contained emitter assembly 100 may be turned at depth and may be used in a tethered (e.g., to an above-water device via the cable 612) or untethered configuration. As described herein, the self-contained emitter assembly 100 may be remotely operated relative to the surface, such as a dive bell or deck box.

The system 1000 and/or the self-contained emitter assembly 100 may be rotated to different angles by the user U (e.g., a diver) at depth. The leveling feet 412 may be changed at depth, as well as the distance D to the detector 200. The mounting system 500 may be replaced with another mounting system 500 or a mounting system configured different from the mounting system 500.

Although the self-contained emitter assembly 100 is described as being operable by a user U to conduct underwater imaging with respect to a target, the present disclosure is not so limited. For instance, the self-contained emitter assembly 100 may be coupled directly to a remote operated vehicle (ROV) 600 for underwater imaging. The ROV 600 may be adapted to engage the emitter assembly mount 410 for coupling the ROV 600 to the self-contained emitter assembly 100. The ROV 600 may be coupled to the external device connector 184 to obtain imaging information from the self-contained emitter assembly 100. Additionally, or alternatively, the ROV 600 may direct the self-contained emitter assembly 100, via the external device connector 184, to conduct an imaging procedure with respect to a target T. The ROV 600 in one configuration may be operable to supply power to the self-contained emitter assembly 100 via the external device connector 184.

Figure 9:
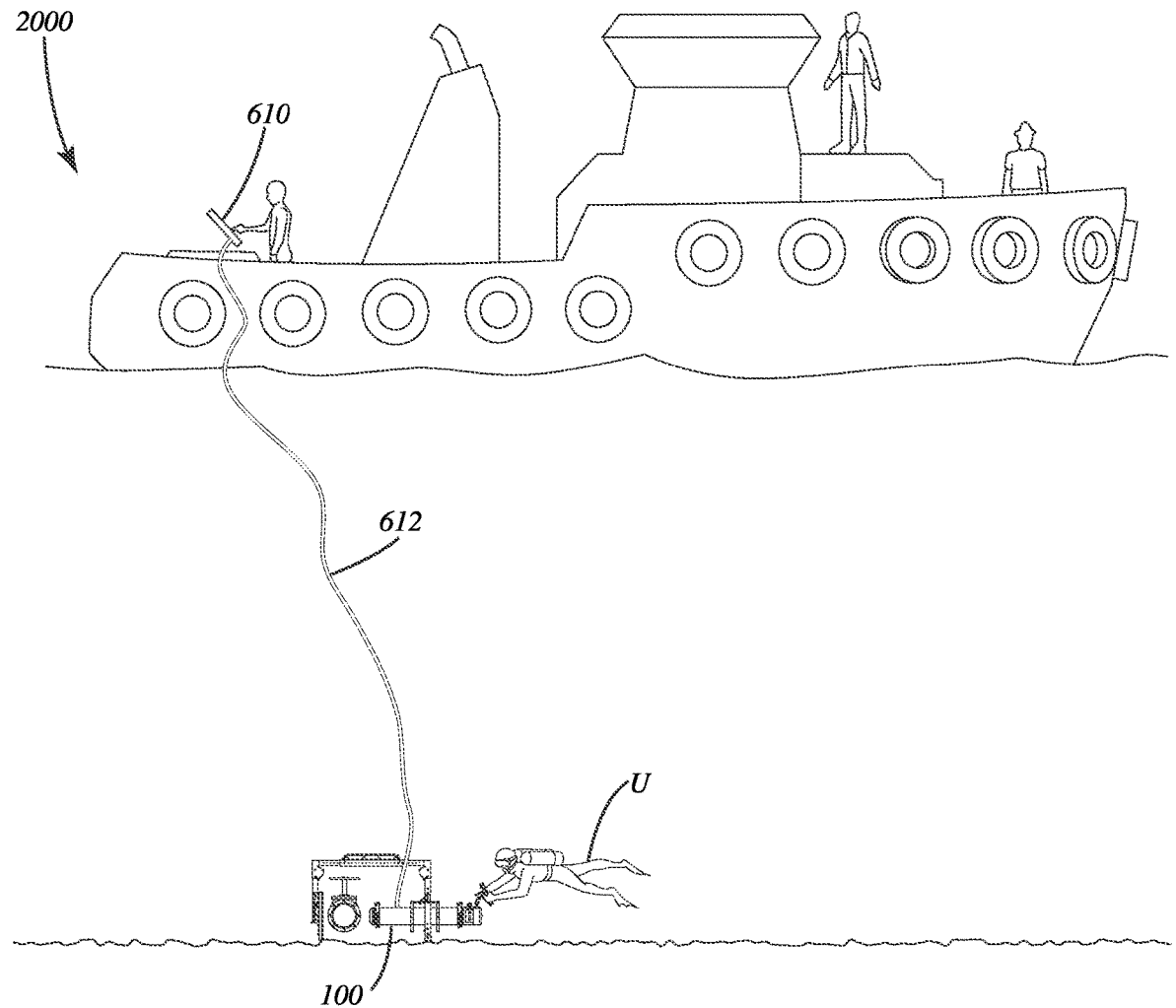
FIG. 9 shows a system according to one aspect of the present disclosure.

As described herein, the self-contained emitter assembly 100 may be coupled to an external device via the external device connector 184. The external device may take the form of a user interface 300 in one aspect. However, the present disclosure is not so limited—the external device in one aspect may correspond to an above-water user interface 610 that is provided onboard a boat or ship above water as depicted in FIG. 9 as part of a system 2000. The above water user interface 610 may be operable to receive information from the self-contained emitter assembly 100 that is based on the imaging information received from the detector 200, via the external device connector 184 and a cable 612. The cable 612 may be sufficiently long to enable the user U to maneuver the self-contained emitter assembly 100 in place with respect to the target T and to allow the control system 120 to communicate to the above water user interface 610. The above water user interface 610 or another above-water component in one configuration may be operable to supply power to the self-contained emitter assembly 100 via the cable 612, potentially recharging the power supply 122 of the self-contained emitter assembly 100 while underwater.

The external device connector 184 may be configured to facilitate network-based communication with an external device and the control system 120. A network-based link between the control system 120 and the external device (e.g., an above-water system [such as the controller and power system 614] or the user interface 300, or another device) may enable communication with a variety of external devices according to a standard protocol. An external device, such as the user interface 300 (below water) and/or the user interface 610 (above water) may enable control over the self-contained emitter assembly 100 and/or the system that includes the self-contained emitter assembly 100.

Figure 10:
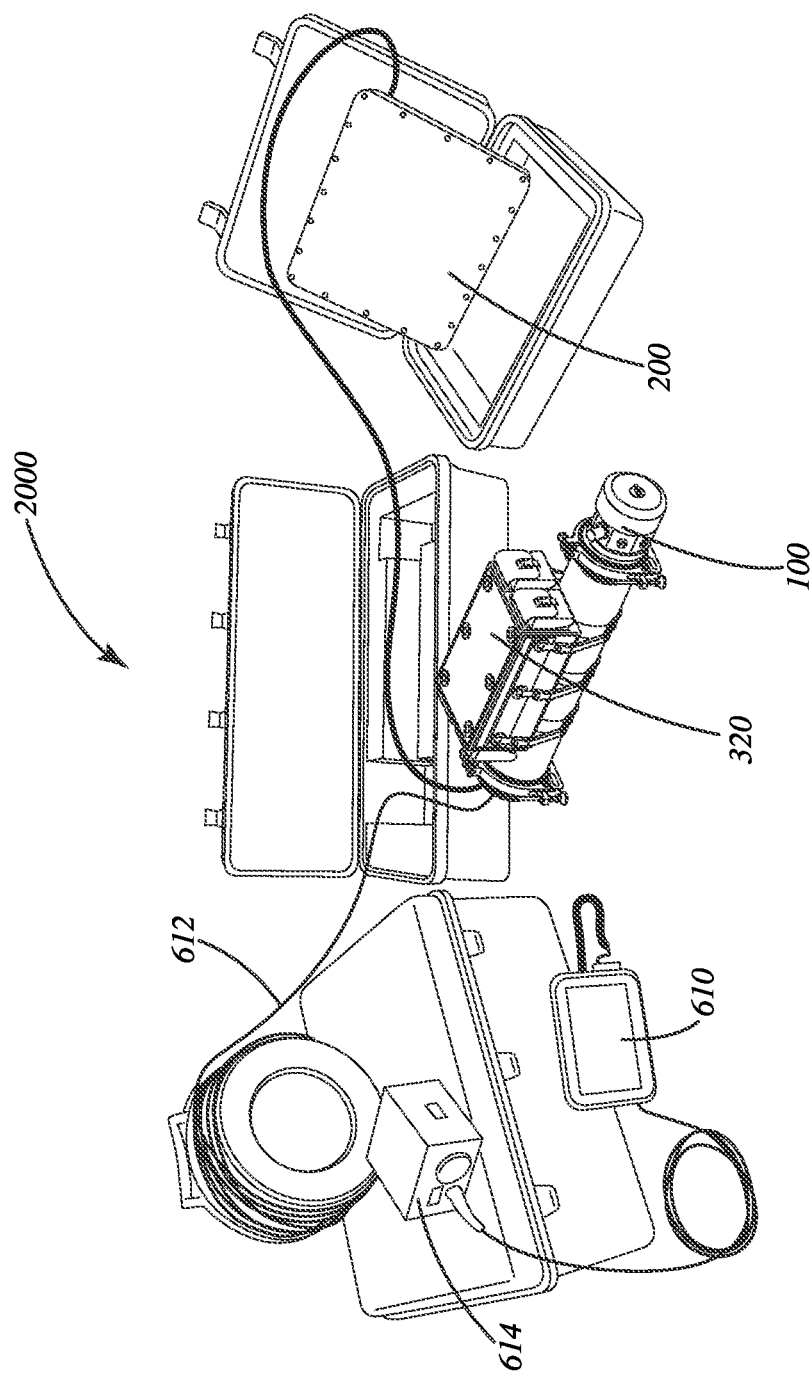
FIG. 10 shows another view of the system of FIG. 9.

The above-water user interface 610 along with the self-contained emitter assembly 100 and other components of the system 2000 are shown in further detail in FIG. 10, with the cable 612 and the other components shown above water. The above water user interface 610 may be operable in conjunction with a power and communications system 614 configured to couple to the cable 612 and optionally provide power to the self-contained emitter assembly 100 via the cable 612. The power and communications system 614 may also facilitate communications between the above-water user interface 610 and the self-contained emitter assembly 100.

Operating the self-contained emitter assembly 100 in conjunction with other components of the system 2000 (e.g., a diver-operated underwater pulsed X-Ray imaging system) may be familiar to users that have operated conventional land-based systems, such as, for example, a Golden X-ray generator and Novo imaging panel). FIG. 10 shows several components of the system 2000—although it is to be understood that the system 2000 is not limited to the specific set of components depicted in FIG. 10. The system 2000 may include fewer or more components. In one aspect, the system 2000 may include one or more components of the system 1000, and further one or more components described in conjunction with the system 2000 may be absent.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A system for underwater imaging comprising:
   a self-contained emitter assembly operable to generate and emit X-rays underwater, the self-contained emitter assembly including:
   an X-ray emitter configured to generate a collimated beam of X-rays;
   a power supply operable to supply operational power to the X-ray emitter, the power supply being rechargeable and adapted to supply sufficient power to the self-contained emitter assembly absent an external connection to a power supply;
   a control system coupled to the power supply and the X-ray emitter, the control system configured to cause the X-ray emitter to controllably draw power from the power supply to generate the collimated beam of X-rays in a pulsed manner;
   a housing containing the X-ray emitter, the power supply, and the control system, the housing including an X-ray transmissive aperture that permits emission of the collimated beam of X-ray pulses from the self-contained emitter assembly for transmission through water and toward a target, the housing being submersible underwater and configured to prevent leakage of water into the housing, the housing being a pressure tolerant enclosure configured to operate underwater at significant external pressures without leakage of water into the housing;
   a float system operatively coupled to the housing, the float system adapted to provide at least one of neutral buoyancy and negative buoyancy with respect to the self-contained emitter assembly;
   an accessory mount and a user interface coupler disposed on the housing;
   a detector operable to removably couple to the self-contained emitter assembly via a cable to communicate with the control system, the detector operable to detect the collimated beam of X-ray pulses emitted from the self-contained emitter assembly and transmitted through water, then transmitted through the target, and then transmitted from the target through water to the detector, the detection of the X-ray pulses by the detector being synchronized by the control system to the emission of the X-ray pulses by the X-ray emitter, the detector operable to transmit image information via the cable to the control system, the image information produced by the detector based on the detected collimated beam of X-ray pulses, the detector including a detector housing that is submersible underwater and configured to prevent leakage of water into the detector housing, the detector housing being separate from the housing that contains the X-ray emitter, the detector housing being pressure tolerant for operation underwater at significant pressures without leakage of water into the detector housing, wherein the float system is operatively coupled to the detector housing and provides the at least one of neutral buoyancy and negative buoyancy with respect to the detector housing;

a user interface mountable to the self-contained emitter assembly through the accessory mount and operable to communicate with the control system through the user interface coupler, the user interface being operable to receive user input from the user underwater, wherein in response to a request input received by the user interface from the user underwater, the control system produces, based on the image information received from the detector, an image of the target and presents the target image in the user interface, and in response to an adjustment input received by the user interface from the user underwater for improving the presented target image, the control system adjusts operation of the X-ray emitter and/or the detector; and a mounting assembly for mounting the detector to the self-contained emitter assembly, the mounting assembly being reconfigurable to facilitate at least one of 1) moving the detector relative to the X-ray transmissive aperture and 2) affixing the system to another object.

2. The system of claim 1 wherein the mounting assembly is reconfigurable to position the target between the detector and the self-contained emitter assembly, whereby the mounting assembly is adaptable to accommodate differently sized targets.

3. The system of claim 1 wherein the mounting assembly includes a main support coupled to first and second arms, the first arm being operably coupled to the self-contained emitter assembly, the second arm being operably coupled to the detector.

4. The system of claim 3 wherein the first and second arms are adjustable in length such that each of the first and second arms is independently adjustable.

5. The system of claim 4 wherein the main support is adjustable in length such that a distance between the first and second arms is variable.

6. The system of claim 3 wherein the first and second arms are coupled respectively to first and second ends of the main support.

7. The system of claim 1 wherein:
the user interface coupler is configured for connection to a cable; and
the user interface is operable to communicate with the control system of the self-contained emitter assembly via the cable connected to the user interface coupler.

8. The system of claim 1 wherein the detector is moveable relative to the self-contained emitter assembly, such that the detector is movable over a variable distance from the X-ray transmissive aperture.

9. The system of claim 8 wherein the detector is movable by an underwater operator.

10. The system of claim 1 wherein the self-contained emitter assembly includes an external connector operable to communicate with an external device via a cable.

11. The system of claim 10 wherein the external device is provided above-water.

12. The system of claim 10 wherein the self-contained emitter assembly is operable to transmit information based on the image information to the external device via the cable.

13. The system of claim 1 wherein the detector is operable to conduct an area scan of X-rays emitted from the self-contained emitter assembly.

14. The system of claim 1 comprising a detector connector operable to couple the control system, via a cable, to the detector external to the housing of the self-contained emitter assembly.

* * * * *